3,183,093
LIGHT SENSITIVE DIAZOTYPE MATERIAL CONTAINING DIBENZYL ALKYLAMINE COUPLING AGENTS
Heinz Schlesinger, Wiesbaden, and Walter Müller, Wiesbaden-Biebrich, Germany, assignors, by mesne assignments, to Keuffel & Esser Co., Hoboken, N.J.
No Drawing. Filed Mar. 28, 1963, Ser. No. 268,587
Claims priority, application Germany, Dec. 9, 1959, K 39,385
12 Claims. (Cl. 96—91)

The invention relates to a diazotype material, and in particular to the use of certain azo components in the light sensitive coating. In a preferred embodiment, the invention relates to a diazotype material in which the light sensitive coating is supported by a base which is transparent or at least light transmitting.

In the reproduction of machine drawings, printed material, pictures, and other original material, it is often advantageous to prepare an intermediate or transitional copy on transparent or semitransparent diazo copying material and to use this intermediate or transitional copy as an original for the production of further copies. The intermediate copies are obtained by the exposure to actinic light of transparent or semitransparent light sensitive diazotype material either by the direct or by the reflex process. The exposed material is then developed, either by means of gaseous ammonia, as in the two-component diazotype process, or by treatment with an alkaline solution of the azo component, as in the one-component or "moist" development process.

The use of intermediate or transitional copies as masters in the production of further copies is of particular value when a fairly large number of prints have to be made from a valuable or not very strong original which would be severely worn, if not completely destroyed by the repeated exposure to light involved in the production of the required number of prints. When the original is non-transparent and therefore not capable of being copies upon a diazo coating except by means of reflex lighting, the preparation of a transitional copy of this sort is not only advantageous but indeed essential.

The usability of an intermediate copy depends on the covering power or opacity to ultra-violet light of the azo dyestuff image and the transparency of the background. Apart from the fact that the base supporting the light sensitive coating is light transmitting, the transparency of the background depends, in the case of two-component coatings, on the resistance of the diazo and azo component to premature coupling.

An object of the present invention is to provide a coupling component which produces improved results particularly in intermediate originals from which final copies can be made avoiding damage to the original.

A further object is to provide a method of making copies in which the lines of the copies are sufficiently opaque to actinic light to provide for rapid duplication of copies therefrom.

One of the advantages of the couplers in accordance with this invention is their reduced diffusion. This greatly reduces migration of the couplers from the surface to the inner of the diazotype material base and thus ensures unchanged colour quality for long periods of storage, and also reduces migration of the coupler contained in an intermediate copy made in accordance with this invention, off the intermediate copy material into another copy material when in contact therewith.

Another object is to provide new and useful dibenzyl alkylamines.

In the following, azo components are described which, when coupled with diazo compounds, will give dyestuffs of excellent covering power and, therefore, are highly suitable for the preparation of diazotype reproduction coatings for intermediate originals, and which, also, because of the yellowish green color of the product obtained when coupling them with diazo compounds of the known light sensitive types, are suitable for the production of color mixtures, in particular for the production of browns and blacks.

The light sensitive diazotype material of this invention comprises a light transmitting base carrying a coating which comprises a light sensitive diazonium compound and at least one diazo coupler which is an N,N-bis-(dialkyl-hydroxybenzyl)-alkylamine of the group represented by the general formulae

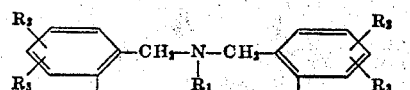

and

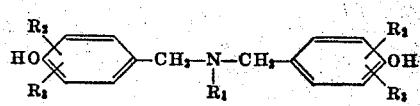

in which formula $R_1$ stands for a member of the group consisting of alkyl, hydroxyalkyl, alkoxyalkyl and alkylaminoalkyl, each having at most a total of four alkyl carbon atoms, and cyclohexyl, and $R_2$ and $R_3$ each represents an alkyl group having at most 4 carbon atoms.

The diazo couplers according to the invention can be prepared by the Mannich condensation process, in which dialkyl phenols are reacted with formaldehyde and primary aliphatic or cycloaliphatic alkyl amines, preferably in the presence of a solvent; the alkyl group of the alkyl-amines may be substituted. The diazo couplers may be present as free amino bases or as the salts thereof, e.g. as the hydrochlorides.

Suitable dialkyl phenols are, e.g., 2,5-dimethylphenol, 3,5-dimethylphenol, 3-methyl-5-ethyl-phenol, 2,6-dimethylmethyl-phenyl, 3-methyl-5-isopropyl-phenol, 3-methyl-6-tertiary-butyl-phenol.

Examples of applicable amine components are: methylamine, ethyl-amine-2-diethylamino-ethylamine, cyclohexylamine, 2-hydroxy-ethyl-amine.

The preparation of the compounds is illustrated by the following examples.

N,N - bis - (2,4-dimethyl-6-hydroxy-benzyl)-methylamine is obtained if a mixture of 200 parts by volume of 30% aqueous formaldehyde solution, 103 parts by weight of 30% aqueous methylamine solution, and 200 parts by volume of methanol is introduced dropwise, with stirring, at room temperature, into a solution of 24.4 parts by weight of 3,5-dimethyl-phenol in in 300 parts by volume of methanol. Stirring is continued for one hour for the completion of the reaction. After the reaction mixture has stood for a number of hours an oily layer which is partially crystalline separates out.

In preparing the coating solution for making the diazo-type material according to this invention, the bis-(dialkyl-hydroxybenzyl)-alkylamines may be applied as the free amines or as the neutralized amines, i.e. as the salts of the amines and an acid. Any suitable acid may form the salt, e.g. hydrochloric hydrobromic, sulfuric or phosphoric, acetic, formic and phenyl sulfonic acid. The choice, whether the free or the neutralized amine is applied, depends chiefly on the fact that some of the amines are easier obtainable when in the free state while others are easier obtainable as the salts thereof. However, in the diazotype material of this invention, the amines are present as the salts thereof. In those cases, where they have originally been applied as the free amines, the coating solution should contain an amount of acids or other acid compounds which is sufficient for neutralising the free base. The presence of acids in diazotype coating solutions is usual in any case, e.g. the presence of citric acid, boric acid or aluminum sulphate.

The supernatant aqueous layer is decanted and 100 parts by volume of methanol are added to the oily crystalline mixture remaining whereupon the whole mass crystallizes. The reaction product is in the form of colorless crystals with a melting point of 177–178° C.

Further compounds falling within the scope of the invention can be obtained in analogous manner, where necessary with slight alterations, e.g. in the type and quantity of solvent used, as dictated by the solubility of the reaction partners.

Such compounds include:

N,N-bis-(2,5-dimethyl-6-hydroxy-benzyl)-ethylamine hydrochloride, melting point 189–190° C.
N,N-bis-(2,5-dimethyl-6-hydroxy-benzyl)-cyclohexylamine-hydrochloride, melting point 142–144° C. (decompositon).
N,N-bis-(2,5-dimethyl-4-hydroxy-benzyl)-methylamine, melting point 156–157° C.
N,N-bis-(2,4-dimethyl-6-hydroxy-benzyl)-2'-diethylamino-ethylamine-hydrochloride, melting point 90–92° C. (decomposition).
N,N-bis-(2,4-dimethyl-6-hydroxy-benzyl)-2'-hydroxyethylamine, melting point 162–163° C.
N,N-bis-(3,5-dimethyl-4-hydroxy-benzyl)-methylamine-hydrochloride, melting point 206–208° C.
N,N-bis-(3,4-dimethyl-2-hydroxy-benzyl)-methylamine-hydrochloride, melting point 65° C. (decomposition).
N,N-bis-(2-methyl-5-tertiary-butyl-6-hydroxy-benzyl)-methylamine-hydrochloride, melting point 175–176° C.
N,N-bis-(2,4-dimethyl-6-hydroxy-benzyl)-ethylamine, melting point 178–180° C.
N,N-bis-(2-methyl-4-ethyl-6-hydroxy-benzyl)-methylamine-hydrochloride, melting point 78° C. (decomposition.
N,N-bis-(2,5-dimethyl-6-hydroxy-benzyl)-3'-methoxypropylamine-(1')-hydrochloride, melting point 60° C. (decomposition).
N,N-bis-(2,4-dimethyl-6-hydroxy-benzyl)-2'-hydroxypropyl-amine, melting point 167–168° C.
N,N-bis-(2,5-dimethyl-6-hydroxybenzyl)-2'-diethylaminoethylamine-hydrochloride, melting point 90–95° C. (decompositon).
N,N,-bis-(2-methyl-4-ethyl-6-hydroxybenzyl)-proplyamine, melting point 169° C.
N,N-bis-(2,4-dimethyl-6-hydroxybenzyl)-butylamine, melting point 151–152° C.
N,N-bis-(2,4-dimethyl-6-hydroxybenzyl)-propylamine, melting point 183–184° C.

*Example I*

A transparentized paper is coated with a solution of 6 parts by weight of the diazo compound from 1-amino-3-methyl-4-N-ethylamino-benzene (in the form of the zinc chloride double salt), 4 parts by weight of citric acid, 3 parts by weight of boric acid, 2 parts by weight of aluminum sulphate, 5 parts by weight of thiourea, and 2.4 parts by weight of N,N-bis-(2,4-dimethyl-6-hydroxybenzyl)-methylamine in 100 parts by volume of water. The coated paper is exposed behind a master to an 18-amp. arc lamp and then developed in the normal manner with gaseous ammonia. The prints obtained in this manner are yellow in color and are excellently suited as intermediate originals for the preparation of further copies.

*Example II*

A transparentized paper lacquered with acetyl cellulose is coated with a solution of 2.9 parts by weight of N,N-bis-(2,4-dimethyl-6-hydroxy-benzyl)-ethyl-amine, 4 parts by weight of the diazo compound from 1-amino-3-methyl-4-N-ethylaminobenzene, 3 parts by weight of citric acid, 2 parts by weight of aluminum sulphate, 2 parts by weight of thiourea, 1 part by weight of boric acid in 35 parts by volume of water and 50 parts by volume of isopropyl alcohol and it is dried. It is then exposed behind a master to an 18-amp. arc lamp. After development with gaseous ammonia yellow prints which can be readily used as intermediate originals are obtained.

*Example III*

The procedure described in Example II is followed but the azo component N,N-bis-(2,4-dimethyl-6-hydroxy-benzyl)-ethylamine is replaced by 3.8 parts by weight of N,N-bis-(2-methyl - 5 - tertiary-butyl-6-hydroxy-benzyl)-methylamine hydrochloride.

*Example IV*

A transparentized paper is coated with a solution of 2.1 parts by weight of N,N-bis-(3,5-dimethyl-4-hydroxylbenzyl)-methylamine-hydrochloride, 6 parts by weight of citric acid, 4 parts by volume of concentrated pure hydrochloric acid, 3 parts by weight of boric acid, 2 parts by weight of aluminum sulphate, 5 parts by weight of thiourea and 3 parts by weight of the diazo compound from 1-amino-4-morpholino-benzene (in the form of the zinc chloride double salt) in 100 parts by volume of water and 15 parts by volume of isopropyl alcohol. After it has been dried it is exposed to light and developed with gaseous ammonia in the normal manner. A print in yellow with good covering power is obtained.

*Example V*

A solution of 3 parts by weight of N,N-bis-(3,5-dimethyl-4-hydroxy-benzyl) - methylamine hydrochloride, 0.8 part by weight of 2-hydroxy-naphthalene-3,6-disulphonic acid (sodium salt), 3 parts by weight of the tetrafluoboric acid salt of the diazo compound from 1-amino-4-morpholino-benzene, 4 parts by weight of citric acid, 3 parts by weight of boric acid, 2 parts by weight of aluminum sulphate and 5 parts by weight of thiourea in 95 parts by volume of water and 5 parts by volume of isopropyl alcohol is coated upon paper and dried for a short period at 80° C. After the material has been exposed behind a master to an 18-amp. arc lamp it is developed in the usual manner with gaseous ammonia. The prints obtained have an attractive brown color.

*Example VI*

A solution of 1.5 parts by weight of N,N-bis-(2,5-dimethyl-4-hydroxy-benzyl)-methylamine, 5.5 parts by weight of citric acid, 2.5 parts by weight of boric acid, 3 parts by weight of aluminum sulphate, 4 parts by weight of thiourea and 2.5 parts by weight of the diazo compound from 1-amino-4-N-ethylamino benzene (zinc chloride double salt) in 85 parts by volume of water and 15 parts by volume of isopropyl alcohol is applied to a transparentized paper in the normal manner. The coating is dried and then exposed behind a master to the light of an 18-amp. arc lamp. After development with gaseous ammonia a yellow print is obtained which is suitable for further copies.

In the above examples the proportions by weight are in grams and the proportions by volume are in cubic centimeters.

It will thus be evident that applicants have provided an improved light sensitive diazo type coating material on a transparent base from which additional copies can be made and it will be evident that various changes can be made within the valid scope of the claims.

This application is a continuation-in-part of abandoned application Serial Number 71,131, filed November 23, 1960.

What is claimed is:

1. A light sensitive diazotype material comprising a light transmitting base carrying a coating which comprises a light sensitive diazonium compound and at least one diazo coupler selected from the group consisting of an N,N-bis-(dialkyl-hydroxybenzyl)-alkylamine of the group represented by the general formulae

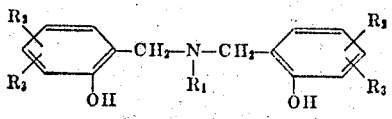

and

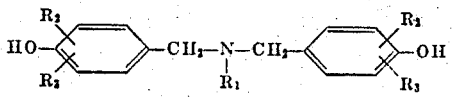

and salts thereof, in which formulae
R₁ stands for a member of the group consisting of alkyl, hydroxyalkyl-alkoxyalkyl, and alkylaminoalkyl, each having at most a total of four alkyl carbon atoms, and cyclohexyl, and
R₂ and R₃ each represents an alkyl group having at most 4 carbon atoms said coupler and said diazonium compound being capable of forming a dyestuff having excellent covering power.

2. A material in accordance with claim 1 in which said diazo coupler is N,N-bis-(2,5-dimethyl-4-hydroxybenzyl)-methylamine.

3. A material in accordance with claim 1 in which said diazo coupler is N,N-bis-(3,5-dimethyl-4-hydroxybenzyl)-methylamine hydrochloride.

4. A material in accordance with claim 1 in which said diazo coupler is N,N-bis-(2,4-dimethyl-6-hydroxybenzyl)-2'-hydroxyethylamine hydrochloride.

5. A material in accordance with claim 1 in which said diazo coupler is N,N-bis-(2,5-dimethyl-6-hydroxybenzyl)-3-methoxypropylamine hydrochloride.

6. A material in accordance with claim 1 in which said diazo coupler is N,N-bis-(2,4-dimethyl-6-hydroxybenzyl)-methylamine.

7. A photo-sensitive composition for diazotype materials, which comprises a photo-sensitive diazo compound and a diazo coupler selected from the group consisting of an N,N-bis-(dialkyl-hydroxy-benzyl)-alkyl-amine of the group represented by the general formulae:

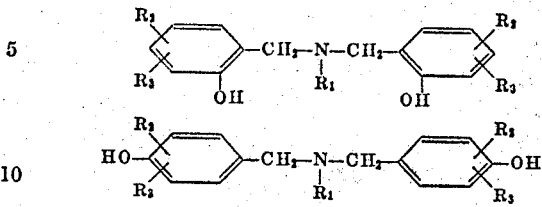

and salts thereof, in which R₁ stands for a member of the group consisting of alkly, hydroxyalkyl, alkoxyalkyl, and alkylaminoalkyl, each having at most a total of four alkyl carbon atoms, and cylohexyl; and R₂ and R₃ each represents an alkyl group having at most 4 carbon atoms, said diazonium compound and said coupler being capable of forming a dyestuff having excellent covering power.

8. A phototsensitive composition in accordance with claim 7 in which said diazo coupler is N,N-bis-(2,5-dimethyl-4-hydroxybenzyl)-methylamine.

9. A photosensitive composition in accordance with claim 7 in which said diazo coupler is N,N-bis-(3,5-dimethyl-4-hydroxybenzyl)-methylamine hydrochloride.

10. A photosensitive composition in accordance with claim 7 in which said diazo coupler is N,N-bis-(2,4-dimethyl-6-hydroxybenzyl)-2'-hydroxyethylamine hydrochloride.

11. A photosensitive composition in accordance with claim 7 in which said diazo coupler is N,N-bis-(2,5-dimethyl-6-hydroxybenzyl)-3-methoxypropylamine hydrochloride.

12. A photosensitive composition in accordance with claim 7 in which said diazo coupler is N,N-bis-(2,4-dimethyl-6-hydroxybenzyl)-methylamine.

References Cited by the Examiner
UNITED STATES PATENTS

| | | | |
|---|---|---|---|
| 2,650,925 | 9/53 | Ouperoff-Urne | 260—268 |
| 2,829,976 | 4/58 | Tomanek | 96—91 |
| 2,926,193 | 2/60 | Rigterink | 260—570.9 |
| 2,940,852 | 6/60 | Herrick et al. | 96—91 |
| 2,998,452 | 8/61 | Bruson et al. | 260—570.9 |
| 3,064,049 | 11/62 | Cox | 260—560 |

NORMAN G. TORCHIN, *Primary Examiner.*

UNITED STATES PATENT OFFICE
CERTIFICATE OF CORRECTION

Patent No. 3,183,093    May 11, 1965

Heinz Schlesinger et al.

It is hereby certified that error appears in the above numbered patent requiring correction and that the said Letters Patent should read as corrected below.

Column 1, line 39, for "copies" read -- copied --; column 2, line 55, strike out "in", first occurrence; column 3, line 17, for "compouds" read -- compounds --; column 5, line 22, for "hydroxyalkyl-alkoxyalkyl," read -- hydroxyalkyl, alkoxyalkyl, --; line 26, after "atoms" insert a comma; same line 26, "said coupler" should appear as the beginning of a new subparagraph; column 6, lines 4 to 6, for the right-hand portion of the formula reading

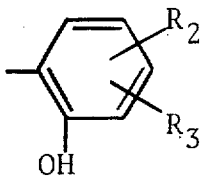   read   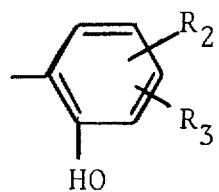

line 13, for "alkly" read -- alkyl --; same column 6, line 19, for "phototsensitive" read -- photosensitive --.

Signed and sealed this 23rd day of November 1965.

(SEAL)
Attest:

ERNEST W. SWIDER
Attesting Officer

EDWARD J. BRENNER
Commissioner of Patents